Oct. 12, 1943.　　　　E. A. STONE　　　　2,331,636
CATTLE TAG
Filed Feb. 17, 1941
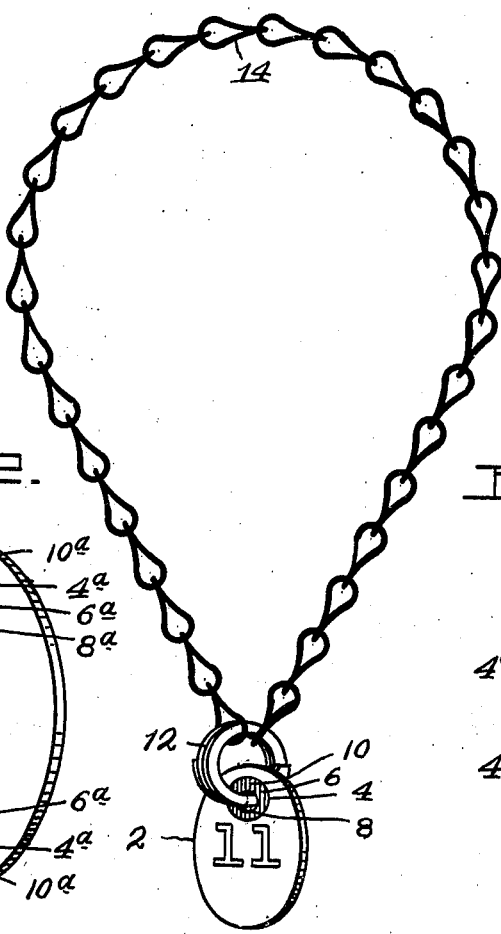
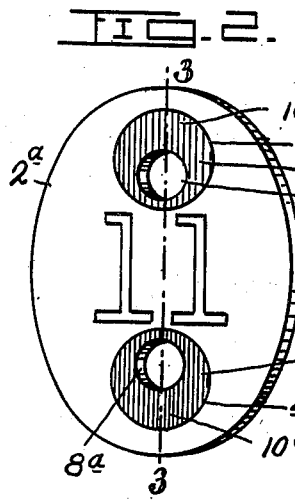
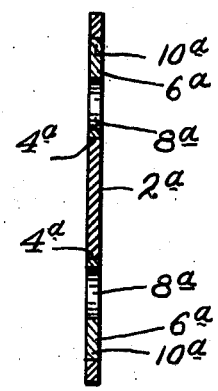
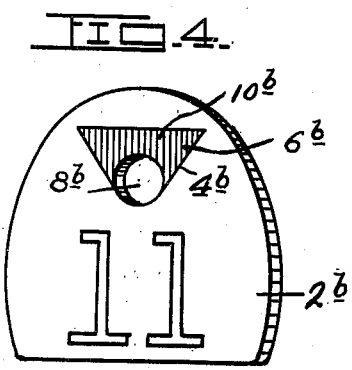
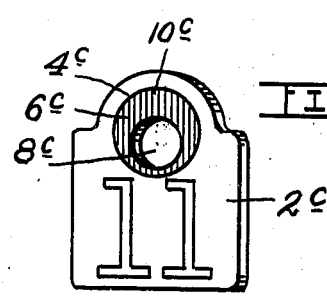
Inventor:
Edwal A. Stone,
By F. G. Fischer,
Attorney Patented Oct. 12, 1943

2,331,636

UNITED STATES PATENT OFFICE 2,331,636

CATTLE TAG

Edwal A. Stone, Kansas City, Mo.

Application February 17, 1941, Serial No. 379,161

1 Claim. (Cl. 40—3)

My invention relates to a new article of manufacture in the form of an identification tag for cattle. Tags of this character have different identification numbers and are adapted to be attached to chains which are worn around the respective necks of the cattle to identify them from each other.

Heretofore it has been the general practice to stamp the tags from ordinary sheet metal, but this kind of metal has the objectionable feature of corroding when exposed to the weather and results in the identification numbers becoming obliterated more or less in the course of time so that they cannot be easily read even at a short distance.

If the tags are stamped from relatively soft rust resisting metal, such for instance as bronze, or brass, the hole formed in the end of each tag for attachment thereof to the chain is liable to become worn through in the course of time due to friction created between the tag and the chain by the movements of the cattle, and may thus result in the loss of the tag.

I overcome the foregoing objections by forming the tags from relatively soft rust resisting metal and reinforcing the holes therein with a harder and relatively hard grade of metal, thereby obtaining a superior type of tag which will last indefinitely and upon which the weather has little or no detrimental effects.

In order that the invention may be fully understood, reference will now be had to the accompanying drawing, in which:

Fig. 1 shows one of my improved tags attached to a chain.

Fig. 2 is an enlarged view of a slightly modified form of tag.

Fig. 3 is a vertical section taken on line 3—3 of Fig. 2.

Figs. 4 and 5 disclose other forms of the tag.

Referring more particularly to the form shown by Fig. 1, 2 designates a tag which is stamped from relatively soft rust resisting material, such for instance as bronze or brass and provided near its upper end with a hole 4. The tag 2 is also provided with an identification number which may be engraved or otherwise formed on the tag.

The hole 4 is reinforced with an element 6 in the form of a disk having an aperture 8. The aperture 8 is located in the lower portion of the disk so that the upper portion 10 will be of greater thickness to provide longer wear from frictional contact with a spiral ring 12 to which the ends of a chain 14 are attached so that the tag may be suspended from the neck of an animal. The element 6 preferably consists of stainless steel or other relatively hard rust resisting material and is forced into the hole 4 under pressure to prevent loss from the tag.

Some cattlemen prefer a chain equipped with two identification tags which are attached to opposite sides of the chain about midway between the upper and lower portions thereof, so that the animal can be identified by a person passing by on either side. To meet the foregoing requirement a tag 2a, Figs. 2 and 3, is provided with a hole 4a near each end and these holes are equipped with disks 6a having respective apertures 8a one of which is placed near the upper part of the lower disk so that the greatest thickness 10a will be at the lower portion of the disk where the wear is greatest.

Where economy is desired when the more expensive hard metal such as stainless steel is used, I provide a tag 2b with an element 6b preferably but not necessarily of triangular form, Fig. 4, which requires less metal than the disk form. The element 6b is pressed into a complemental hole 4b formed in the upper portion of the tag and rounded to form the lower portion of a supplemental hole 8b, the upper portion of which latter is formed by a marginal recess in the lower part of the element 6b.

In the modified form disclosed by Fig. 5 the tag 2c is of somewhat different form than the others above described, but is reinforced with a disk 6c similar to the disk 6.

From the foregoing description taken in connection with the drawing it is apparent that I have provided an identification tag for cattle which is well adapted for the purpose intended, and while I have shown several forms of the invention I reserve all rights to such other forms and modifications thereof as properly fall within the spirit and scope of the invention as claimed.

Having thus described my invention, what I claim and desire to secure by Letters Patent, is:

A new article of manufacture comprising an identification tag having a main body portion of relatively soft material having a triangular hole in its upper portion, and an element of relatively hard material of approximately the same shape as said hole, said element being fixed in the hole and having a recess in a lower corner which communicates with the hole and forms in conjunction therewith a supplemental hole.

EDWAL A. STONE.